United States Patent
Bolger et al.

(10) Patent No.: US 9,805,492 B2
(45) Date of Patent: Oct. 31, 2017

(54) PRE-FETCHING VIRTUAL CONTENT IN A VIRTUAL UNIVERSE

(75) Inventors: Rosa M. Bolger, Austin, TX (US); Ann Corrao, Raleigh, NC (US); Rick A. Hamilton, II, Charlottesville, VA (US); Brian M. O'Connell, Cary, NC (US); Brian J. Snitzer, Lancaster, PA (US)

(73) Assignee: International Business Machines Corporation, Armonk, NY (US)

( * ) Notice: Subject to any disclaimer, the term of this patent is extended or adjusted under 35 U.S.C. 154(b) by 1643 days.

(21) Appl. No.: 12/345,634

(22) Filed: Dec. 31, 2008

(65) Prior Publication Data
US 2010/0164947 A1 Jul. 1, 2010

(51) Int. Cl.
*G06T 13/40* (2011.01)
*G06Q 10/10* (2012.01)

(52) U.S. Cl.
CPC ........... *G06T 13/40* (2013.01); *G06Q 10/10* (2013.01)

(58) Field of Classification Search
USPC .......................................... 345/419; 711/133
See application file for complete search history.

(56) References Cited

U.S. PATENT DOCUMENTS

| | | |
|---|---|---|
| 5,956,039 A | 9/1999 | Woods et al. |
| 6,175,842 B1 | 1/2001 | Kirk et al. |
| 6,179,713 B1 | 1/2001 | James et al. |
| 6,219,045 B1 | 4/2001 | Leahy et al. |
| 6,329,986 B1 * | 12/2001 | Cheng ............................ 345/419 |
| 6,490,577 B1 | 12/2002 | Anwar |
| 6,519,571 B1 | 2/2003 | Guheen et al. |
| 6,598,125 B2 * | 7/2003 | Romm ............................ 711/133 |
| 6,767,287 B1 | 7/2004 | Mcquaid et al. |
| 7,073,129 B1 | 7/2006 | Robarts et al. |
| 7,181,690 B1 | 2/2007 | Leahy et al. |
| 7,206,785 B1 | 4/2007 | Stephens |
| 7,269,632 B2 | 9/2007 | Edeker et al. |
| 7,373,377 B2 | 5/2008 | Altieri |
| 7,797,313 B1 | 9/2010 | Goyal et al. |
| 7,913,176 B1 | 3/2011 | Blattner et al. |
| 8,024,343 B2 | 9/2011 | Gallagher |
| 8,126,985 B1 | 2/2012 | Kandekar et al. |
| 8,601,386 B2 | 12/2013 | Altberg et al. |
| 8,681,144 B2 | 3/2014 | Bolger et al. |
| 8,990,306 B2 | 3/2015 | Bolger et al. |

(Continued)

OTHER PUBLICATIONS

Saha et al., "Helping Based on Future Expectations", AAMAS'03, Jul. 14-18, 2003, Melbourne, Australia.*

(Continued)

*Primary Examiner* — Sultana M Zalalee
(74) *Attorney, Agent, or Firm* — William H. Hartwell; Madeline F. Schiesser; Keohane & D'Alessandro PLLC

(57) ABSTRACT

An invention that pre-fetches virtual content in a virtual universe is provided. In one embodiment, there is a pre-fetching tool, including a ranking component configured to rank each of a plurality of members belonging to a social network of an avatar according to predefined ranking criteria. The pre-fetching tool further includes a pre-fetching component configured to pre-fetch a virtual content within a proximity of each of the plurality of members belonging to the social network of the avatar based on the ranking.

16 Claims, 7 Drawing Sheets

(56) References Cited

U.S. PATENT DOCUMENTS

| | | | |
|---|---|---|---|
| 9,498,727 B2 | 11/2016 | Bolger et al. | |
| 2002/0138607 A1 | 9/2002 | O'Rourke et al. | |
| 2002/0188678 A1* | 12/2002 | Edecker et al. | 709/204 |
| 2003/0069780 A1* | 4/2003 | Hailwood et al. | 705/10 |
| 2003/0195735 A1 | 10/2003 | Rosedale et al. | |
| 2005/0071306 A1 | 3/2005 | Kruszewski et al. | |
| 2006/0031578 A1 | 2/2006 | Pelletier | |
| 2006/0184886 A1 | 8/2006 | Chung et al. | |
| 2006/0287980 A1 | 12/2006 | Liu et al. | |
| 2007/0128899 A1 | 6/2007 | Mayer | |
| 2007/0160961 A1 | 7/2007 | Lum | |
| 2007/0179867 A1 | 8/2007 | Glazer et al. | |
| 2007/0240119 A1* | 10/2007 | Ducheneaut et al. | 717/124 |
| 2007/0255702 A1 | 11/2007 | Orme | |
| 2007/0266384 A1 | 11/2007 | Labrou et al. | |
| 2007/0277245 A1 | 11/2007 | Goto et al. | |
| 2007/0288598 A1 | 12/2007 | Edeker et al. | |
| 2008/0071742 A1 | 3/2008 | Yang et al. | |
| 2008/0098064 A1* | 4/2008 | Sherinian | 709/203 |
| 2008/0204450 A1 | 8/2008 | Dawson et al. | |
| 2008/0208684 A1 | 8/2008 | Hamilton et al. | |
| 2008/0263460 A1 | 10/2008 | Altberg et al. | |
| 2008/0287192 A1 | 11/2008 | Lee et al. | |
| 2008/0303811 A1 | 12/2008 | Van Luchene | |
| 2008/0307412 A1 | 12/2008 | Marr et al. | |
| 2008/0309671 A1 | 12/2008 | Shuster et al. | |
| 2008/0320222 A1* | 12/2008 | Dhodapkar | 711/118 |
| 2009/0046094 A1 | 2/2009 | Hamilton, II et al. | |
| 2009/0165140 A1* | 6/2009 | Robinson et al. | 726/26 |
| 2010/0076962 A1 | 3/2010 | Doyle | |
| 2010/0156899 A1 | 6/2010 | Bolger et al. | |
| 2010/0198869 A1 | 8/2010 | Kalaboukis et al. | |
| 2010/0211638 A1 | 8/2010 | Rougier | |
| 2010/0306652 A1 | 12/2010 | Bolger et al. | |
| 2014/0176567 A1 | 6/2014 | Bolger et al. | |
| 2015/0127664 A1 | 5/2015 | Bolger et al. | |

OTHER PUBLICATIONS

Bolger, R. et al., "Prioritized Rendering of Objects in a Virtual Universe,", filed with the USPTO on Dec. 19, 2008, U.S. Appl. No. 12/339,418.
U.S. Appl. No. 12/548,831, Office Action dated Jul. 19, 2012, 23 pages.
U.S. Appl. No. 12/548,831, Office Action dated Dec. 19, 2012, 29 pages.
U.S. Appl. No. 12/548,831, Office Action dated Jun. 3, 2013, 26 pages.
U.S. Appl. No. 12/548,831, Office Action dated Oct. 11, 2013, 28 pages.
U.S. Appl. No. 12/548,831, Office Action dated Feb. 25, 2014, 37 pages.
U.S. Appl. No. 12/548,831, Office Action dated Jul. 11, 2014, 42 pages.
U.S. Appl. No. 12/548,831, Office Action dated Dec. 10, 2014, 31 pages.
U.S. Appl. No. 12/548,831, Office Action dated May 19, 2015, 28 pages.
Marvie et al., "A Vrml97-X3D Extension for Massive Scenery Management in Virtual Worlds", 2004 ACM, 10 pages.
Hadjiefthymiades et al., "Using Proxy Cache Relocation to Accelerate Web Browsing in Wireless/Mobile Communications", WWW10, May 1-5, 2001, 10 pages.
He et al., "Path and cache conscious prefetching (PCCP)", Received: Nov. 20, 2003 / Accepted: Jul. 31, 2005 / Published online: Jul. 13, 2006, Springer-Verlag 2006, 15 pages.
U.S. Appl. No. 12/473,306, Office Action dated Jun. 9, 2011, 21 pages.
U.S. Appl. No. 12/473,306, Office Action dated Mar. 29, 2012, 21 pages.
U.S. Appl. No. 12/473,306, Office Action dated Feb. 27, 2014, 22 pages.
U.S. Appl. No. 12/473,306, Office Action dated Sep. 10, 2014, 14 pages.
U.S. Appl. No. 12/473,306, Notice of Allowance dated Nov. 7, 2014, 13 pages.
Sultana Marcia Zalalee, USPTO Office Action, U.S. Appl. No. 12/339,418, Mail Date Jul. 19, 2011, 18 pages.
Sultana Marcia Zalalee, USPTO Final Office Action, U.S. Appl. No. 12/339,418, Mail Date Aug. 26, 2011, 19 pages.
Sultana Marcia Zalalee, USPTO Office Action, U.S. Appl. No. 12/339,418, Mail Date Feb. 6, 2012, 20 pages.
Sultana Marcia Zalalee, USPTO Final Office Action, U.S. Appl. No. 12/339,418, Mail Date Jun. 15, 2012, 19 pages.
Sultana Marcia Zalalee, USPTO Office Action, U.S. Appl. No. 12/339,418, Mail Date Nov. 21, 2012, 18 pages.
Sultana Marcia Zalalee, USPTO Final Office Action, U.S. Appl. No. 12/339,418, Notification Date Apr. 4, 2013, 27 pages.
Sultana Marcia Zalalee, USPTO Office Action, U.S. Appl. No. 12/339,418, Notification Date Jul. 24, 2013, 30 pages.
Sultana Marcia Zalalee, USPTO Notice of Allowance and Fee(s) Due, U.S. Appl. No. 12/339,418, Date Mailed Nov. 7, 2013, 16 pages.
Yuan, "A personalized and integrative comparison-shopping engine and its applications", Decision Support Systems 3, 2002, pp. 139-156.
U.S. Appl. No. 14/191,528, Office Action dated Nov. 3, 2014, 27 pages.
U.S. Appl. No. 14/191,528, Office Action dated Apr. 20, 2015, 35 pages.
U.S. Appl. No. 14/191,528, Notice of Allowance dated Aug. 28, 2015, 15 pages.
U.S. Appl. No. 12/548,831, Notice of Allowance dated Sep. 16, 2015, 10 pages.
U.S. Appl. No. 14/591,202, Office Action dated Nov. 20, 2015, 25 pages.
U.S. Appl. No. 14/591,202, Notice of Allowance dated Aug. 1, 2016, 12 pages.

* cited by examiner

PRE-FETCHING VIRTUAL CONTENT IN A VIRTUAL UNIVERSE

FIELD OF THE INVENTION

This invention relates generally to virtual universes and more specifically to the caching of virtual content in a virtual universe.

BACKGROUND OF THE INVENTION

Virtual universes or virtual worlds are computer-based simulated environments intended for its users or residents to inhabit and interact via avatars, which are personas or representations of the users of the virtual universes. These types of virtual universes are now most common in massively multiplayer online games such as Second Life®, which is a trademark of Linden Research Inc. in the United States. Avatars in these types of virtual universes, which can number well over a million, have a wide range of business and social experiences.

Many regions within a virtual universe contain complex environments with a large number of objects. Prior art virtual universes only cache items attached to or worn by an avatar, or items located within a predefined proximity of the avatar. As is known in the art, avatars may teleport to new regions within the virtual universe, often at the request or notification of another user. Because the new region(s) to which the avatar transports is not within the predefined proximity, an avatar who accepts a request to transport must wait while objects in the new region are downloaded and rendered. This may not provide an optimal experience, as most users do not like to wait for downloading and rendering.

SUMMARY OF THE INVENTION

In one embodiment, there is a method for pre-fetching virtual content in a virtual universe. In this embodiment, the method comprises: ranking each of a plurality of members belonging to a social network of an avatar according to predefined ranking criteria; and pre-fetching a virtual content within a proximity of each of the plurality of members belonging to the social network of the avatar based on the ranking.

In a second embodiment, there is a computer system for providing pre-fetching of virtual content in a virtual universe. In this embodiment, the system comprises at least one processing unit and memory operably associated with the at least one processing unit. A pre-fetching tool is storable in memory and executable by the at least one processing unit. The pre-fetching tool comprises a ranking component configured to rank each of a plurality of members belonging to a social network of an avatar based on predefined ranking criteria; and a pre-fetching component configured to pre-fetch a virtual content within a proximity of each of the plurality of members belonging to the social network of the avatar based on the ranking.

In a third embodiment, there is a computer-readable medium storing computer instructions, which when executed, enables a computer system to provide pre-fetching of virtual content in a virtual universe. In this embodiment, the computer instructions comprise: ranking each of a plurality of members belonging to a social network of an avatar according to predefined ranking criteria; and pre-fetching a virtual content within a proximity of each of the plurality of members belonging to the social network of the avatar based on the ranking.

In a fourth embodiment, there is a method for deploying a pre-fetching tool for use in a computer system that provides pre-fetching of virtual content in a virtual universe. In this embodiment, a computer infrastructure is provided and is operable to: rank each of a plurality of members belonging to a social network of an avatar according to predefined ranking criteria; and pre-fetch a virtual content within a proximity of each of the plurality of members belonging to the social network of the avatar based on the ranking.

Figure 1:
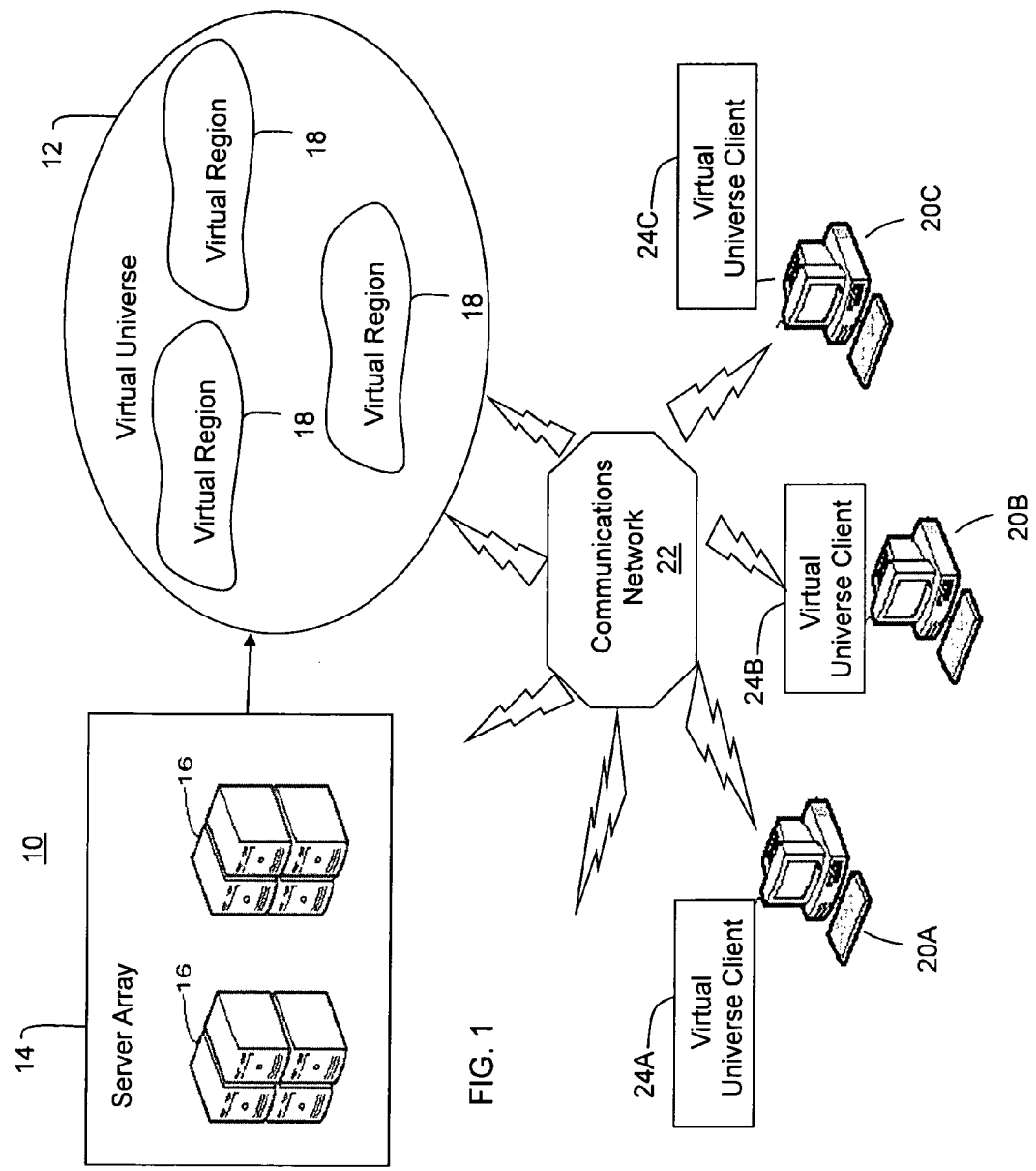
FIG. 1 shows a high-level schematic diagram showing a networking environment for providing a virtual universe according to one embodiment of this invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to pre-fetching virtual content in a virtual universe, such that wait times for the rendering of virtual content are reduced. In these embodiments, a pre-fetching tool provides the capability to pre-fetch virtual content in the virtual universe based on a social network of an avatar. Specifically, the pre-fetching tool pre-fetches the virtual content based on a rank assigned to each of a plurality of members belonging to a social network of the avatar according to predefined ranking criteria, such that virtual content within a proximity of each of the plurality of members belonging to the social network of the avatar is pre-fetched discriminately. Each of the plurality of members belonging to the social network of the avatar is ranked by analyzing a set of past interactions between the avatar and each of the plurality of members to determine a set of members from the plurality of members belonging to the social network of the avatar that are more likely to have a future interaction with the avatar. As used herein, pre-fetching is defined as the downloading and caching of virtual content (i.e., objects, textures and scripts) to a cache prior to the rendering of the virtual content.

FIG. 1 shows a high-level schematic diagram showing a networking environment 10 for providing a virtual universe 12 according to one embodiment of this invention in which a service for pre-fetching virtual content can be utilized. As shown in FIG. 1, networking environment 10 comprises a server array or grid 14 comprising a plurality of servers 16, each responsible for managing a portion of virtual real estate within virtual universe 12. A virtual universe provided by a multiplayer online game, for example, can employ thousands of servers to manage all of the virtual real estate. The virtual content of the virtual real estate that is managed by each of servers 16 within server array 14 shows up in virtual universe 12 as a virtual region 18 made up of objects, textures and scripts. Like the real-world, each virtual region 18 within virtual universe 12 comprises a landscape having virtual content, such as buildings, stores, clubs, sporting arenas, parks, beaches, cities and towns all created by residents of the universe that are represented by avatars. These examples of virtual content are only illustrative of some things that may be found in a virtual region and are not limiting. Furthermore, the number of virtual regions 18 shown in FIG. 1 is only for illustration purposes and those skilled in the art will recognize that there may be many more regions found in a typical virtual universe, or even only one region in a small virtual universe. FIG. 1 also shows that users operating computers 20A-20C (hereinafter referred generally as 20) interact with virtual universe 12 through a communication network 22 via virtual universe clients 24A-24C (hereinafter referred generally as 24) that reside in computers 20, respectively. Below are further details of virtual universe 12, server array 14, and virtual universe client 24.

Figure 2:
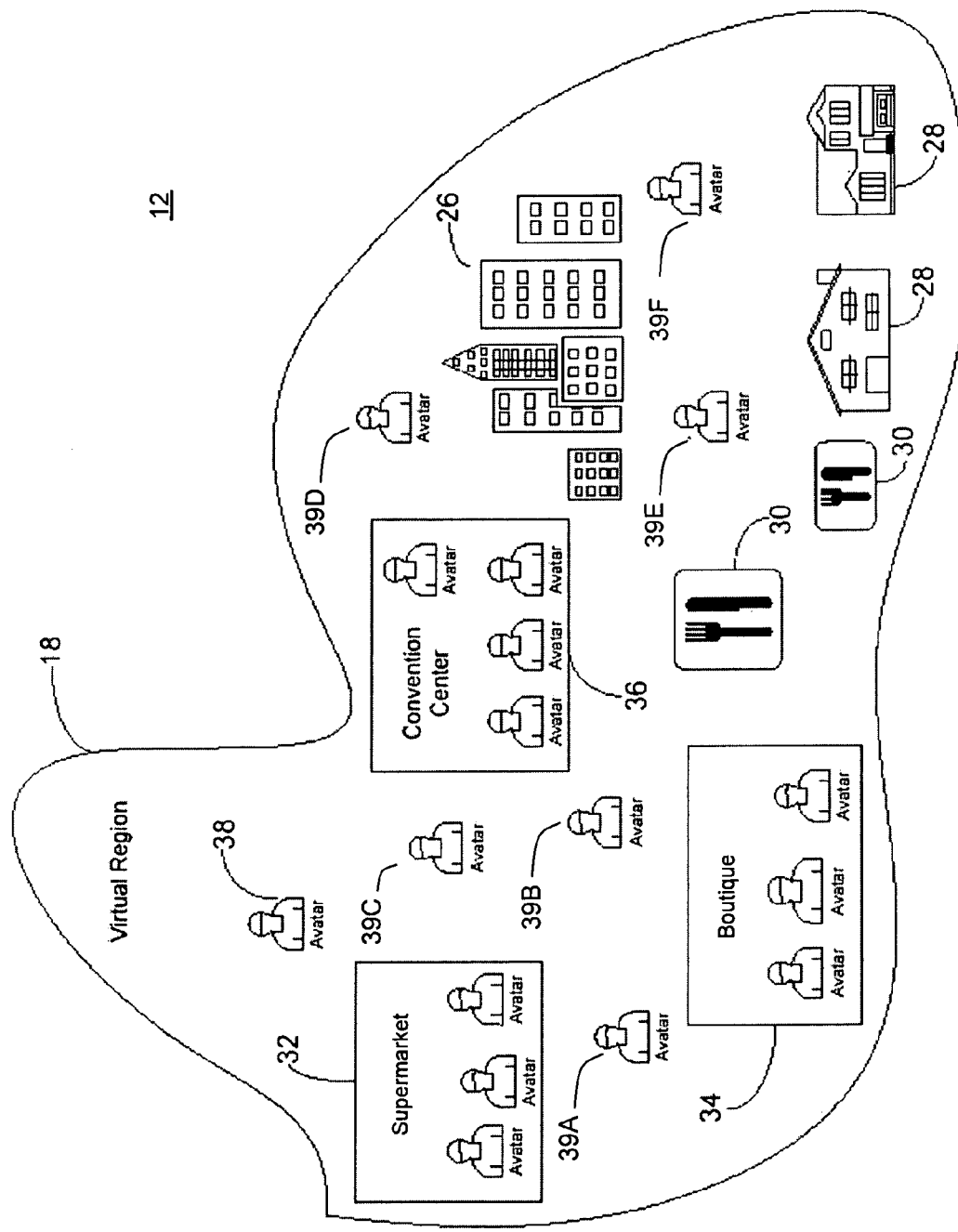
FIG. 2 shows a more detailed view of a virtual region shown in the virtual universe of FIG. 1.

FIG. 2 shows a more detailed view of an exemplary virtual region found in virtual universe 12. As an example, virtual region 18 shown in FIG. 2 comprises virtual content, including: a downtown office center 26, homes 28, restaurants 30, a supermarket 32 and a boutique 34 for shopping, and a convention center 36 for meetings and various conventions. An avatar 38, which as mentioned above, is a persona or representation of a user of the virtual universe, roams all about the virtual region by walking, driving, flying or even by teleportation or transportation, which is essentially moving through the virtual universe from one point to another, more or less instantaneously.

A plurality of members 39A, 39B, 39C, 39D, 39E, 39F (hereinafter referred to collectively as members 39), which are also avatars, represent the members of a social network of avatar 38. As used herein, the social network of avatar 38 is defined as a set (i.e., one or more) of other avatars/users within the virtual universe who have contact with or a connection to avatar 38. Members 39 have past interactions with avatar 38 and are typically considered to be "friends" with avatar 38. Although the invention is described in the context of a single avatar and the members of the avatar's social network, those skilled in the art will recognize that virtual universe 12 can have any number of avatars, members, and combinations of social networks.

Figure 3:
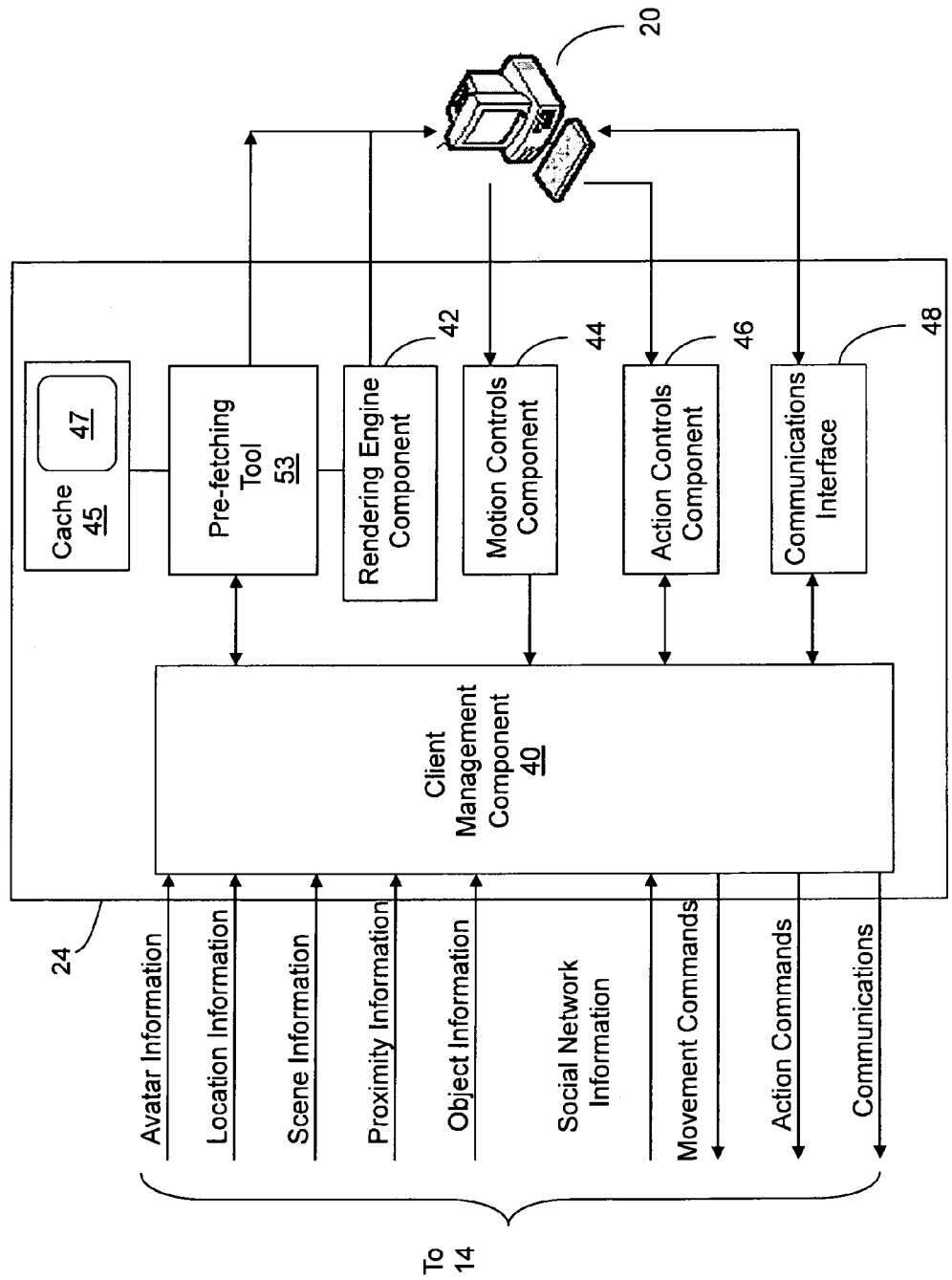
FIG. 3 shows a more detailed view of the virtual universe client shown in FIG. 1.

FIG. 3 shows a more detailed view of virtual universe client 24 shown in FIG. 1. Virtual universe client 24, which enables users to interact with virtual universe 12, comprises a client management component 40, which manages actions, movements and communications made by a user through computer 20, as well as information received from virtual universe 12 through server array 14. A rendering engine component 42 enables the user of computer 20 to visualize his or her avatar within the surroundings of the particular region of virtual universe 12 that the avatar is presently located.

A motion controls component 44 enables the user to make movements through the virtual universe. In one embodiment, movements through the virtual universe can include, for example, gestures, postures, walking, running, driving, flying, etc. An action controls component 46 enables the user to perform actions in the virtual universe such as buying items for his or her avatar or even for their real-life selves, building homes, planting gardens, etc. These actions are only illustrative of some possible actions that a user can perform in the virtual universe and are not limiting. A communications interface 48 enables a user to communicate with other users of virtual universe 12 through modalities such as chatting, instant messaging, gesturing, talking and electronic mail (e-mail).

A pre-fetching tool 53 pre-fetches virtual content within the virtual universe, as will be further described below. As shown in FIG. 3, in the exemplary embodiment, pre-fetching tool 53 resides on the same computer system as virtual universe client 24. In other embodiments, pre-fetching tool 53 might reside on the same side as server array 14, or reside on separate computers in direct communication with virtual universe servers 16 and virtual universe client 24.

A cache 45 is provided for storing pre-fetched virtual content. As used herein, cache 45 is defined as a temporary storage area where frequently accessed data can be stored for rapid access. Cache 45 is a collection of data duplicating original values stored elsewhere or computed earlier, where the original data is expensive to fetch (due to slow access time) or to compute relative to the cost of reading cache 45. Once the data is stored in cache 45, future use may access the cached copy rather than downloading or re-computing the original data, resulting in a lower average access time. As will be further described below, virtual content can be pre-fetched by pre-fetching tool 53 and sent to cache 45 to reduce delays in the rendering of the virtual content.

In one embodiment, cache 45 may be augmented to include a cache expiration component 47 that expires objects that are of least interest to avatar 38. For example, when an object in cache 45 must be expired due to cache size constraints, objects in cache 45 that are currently within the rendering radius or proximity (i.e., distance) of one of members 39 of the social network of avatar 38 are given priority.

FIG. 3 shows the various types of information received by client management component 40 from the virtual universe through server array 14. In particular, client management component 40 receives location information about the area that the user's avatar is near (e.g., what region or land he or she is in), as well as scene information (e.g., what the avatar sees). Client management component 40 also receives information from a social network inventory 64 (shown in FIG. 4), including information identifying members 39 belonging to the social network of avatar 38, and information about the virtual content surrounding each of members 39.

Client management component 40 also receives proximity information, which contains information on what the user's avatar is near, and object information, which is information that can be obtained by one's senses (e.g., touch, taste, smell, etc.). FIG. 3 also shows the movement and action commands that are generated by the user and sent to the server array via client management component 40, as well as the communications that can be sent to other avatars within virtual universe 12.

Figure 4:
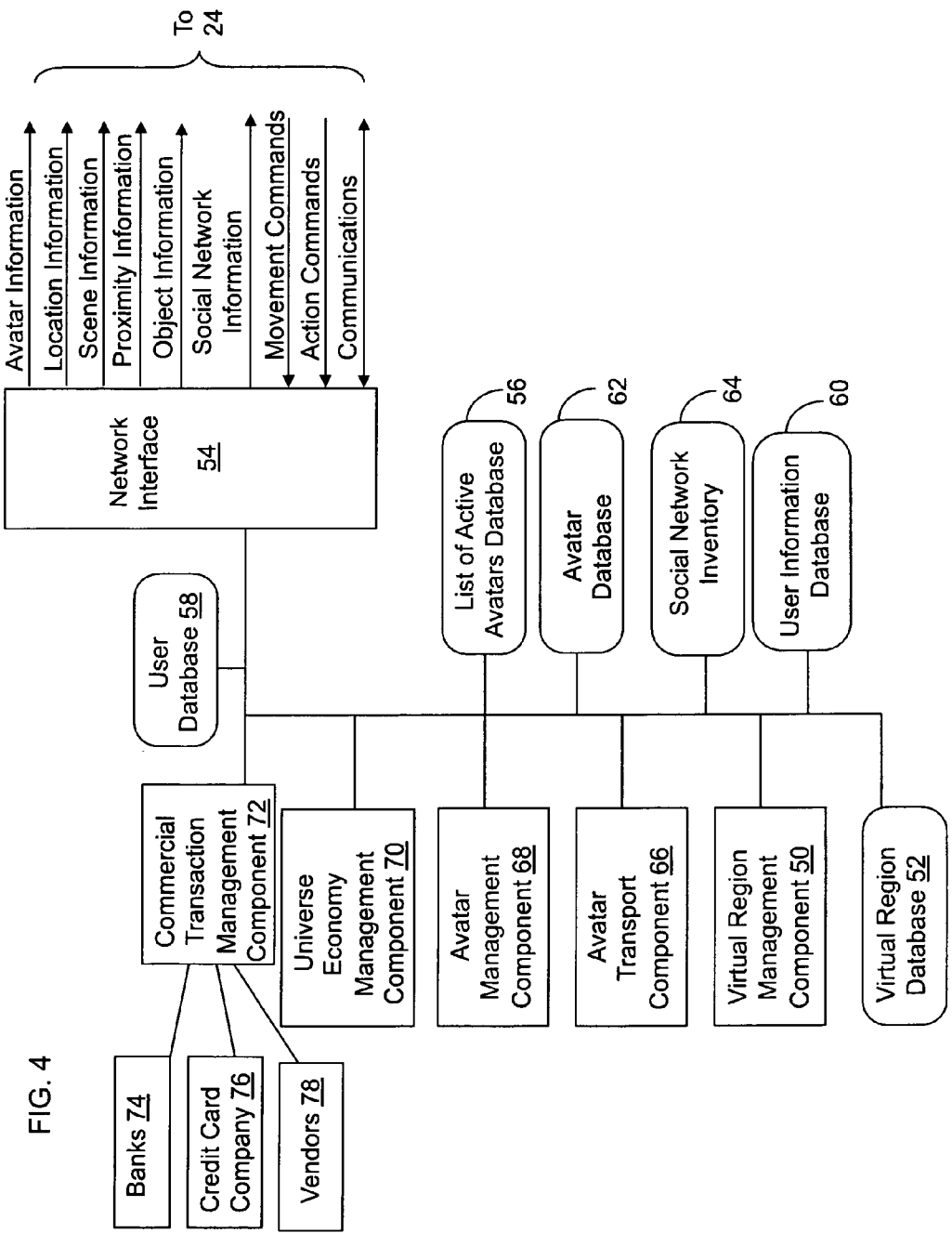
FIG. 4 shows a more detailed view of some of the functionalities provided by the server array shown in FIG. 1.

FIG. 4 shows a more detailed view of some of the functionalities provided by server array 14 shown in FIG. 1. In particular, FIG. 4 shows a virtual region management component 50 that manages a virtual region(s) within the virtual universe. Virtual region management component 50 manages what happens in a particular region, such as the type of landscape in that region, the number of homes, commercial zones, boutiques, streets, parks, restaurants, etc. For example, virtual region management component 50 would allow the owner of a particular region or establishment within the region to specify requirements for entering or remaining within the region that could potentially affect certain avatar characteristics. Those skilled in the art will recognize that virtual region management component 50 can manage many other facets within the virtual region.

FIG. 4 shows a network interface 54 that enables server array 14 to interact with virtual universe client 24 residing on computer 20. In particular, network interface 54 communicates avatar, location, scene, proximity, script, object, and social network information to the user through virtual universe client 24. The network interface receives movement and action commands, as well as communications from the user via virtual universe client 24.

As shown in FIG. 4, there are several different databases for storing information. In particular, a virtual region database 52 stores information on all of the specifics in virtual region 18 that virtual region management component 50 is managing. Specifically, virtual region database 52 contains metadata information about the objects, texts and scripts associated with the virtual content in the virtual region. In one embodiment, for very large virtual universes, one server 16 may be responsible for managing one particular virtual region 18 within the universe. In other embodiments, it is possible that one server 16 may be responsible for handling one particular land within virtual region 18.

Database 56 contains a list of all the avatars that are online in the virtual universe 12, while databases 58 and 60 contain information on the actual human users of virtual universe 12. In one embodiment, database 58 contains general information on the users such as names, addresses, interests, ages, etc., while database 60 contains more sensitive information on the users such as email addresses, and billing information (e.g., credit card information) for taking part in transactions. Databases 62 and 64 contain information on the avatars of the users that reside in virtual universe 12. In one embodiment, avatar database 62 contains information such as all of the avatars that a user may have, the profile of each avatar, and avatar characteristics (e.g., appearance, voice and movement features). Social network inventory 64 is a database that contains an inventory listing of members 39 belonging to the social network of avatar 38. Social network inventory 64 also contains information about the virtual content within a proximity of each of members 39 belonging to the social network of avatar 38. The information is typically in the form of metadata associated with the virtual content within a defined rendering radius of each of members 39. In an exemplary embodiment, social network inventory 64 is dynamically updated with new object information as the location of each of members 39 changes.

Those skilled in the art will recognize that databases 58-64 may contain additional information if desired. Databases 58-64 may be consolidated into a single database or table, divided into multiple database or tables, or clustered into a database system spanning multiple physical and logical devices. Further, although the above information is shown in FIG. 4 as being stored in databases, those skilled in the art will recognize that other means of storing information can be utilized. For example, social network inventory 64 might reside on the same computers as virtual universe client 24, have components that reside on both server array 14 and virtual universe client 24, or reside on separate computers in direct communication with virtual universe servers 16 and virtual universe client 24.

An avatar transport component 66 enables users to transport, which as mentioned above, allows avatars to travel through space from one point to another point, more or less instantaneously. Moving from one virtual region to a second virtual region requires the virtual content in the second region to be rendered as quickly as possible. Pre-fetching tool 53 of the present invention reduces wait times for the rendering of virtual content by pre-fetching the virtual content from the various locations avatar 38 is likely to travel to.

An avatar management component 68 keeps track of what the avatars are doing while in the virtual universe. For example, avatar management component 68 can track where each avatar presently is in the virtual universe, as well as what activities it is performing or has recently performed. An illustrative but non-exhaustive list of activities can include shopping, eating, talking, recreating, etc.

Because a typical virtual universe has a vibrant economy, server array 14 has functionalities that are configured to manage the economy. In particular, a universe economy management component 70 manages transactions that occur within the virtual universe between avatars. In one embodiment, virtual universe 12 will have its own currency that users pay for with real-world money. The users can then take part in commercial transactions for their avatars through universe economy management component 70. For example, an avatar might want to pay for a service that provides this pre-fetching capability. In this case, the avatar would purchase this service using the virtual universe currency. In some instances, the user may want to take part in a commercial transaction that benefits the user and not an avatar. For example, while walking around a commercial zone, a user may see a pair of shoes that he or she would like for themselves and not their avatar. A commercial transaction management component 72 allows the user to participate in the transaction. In order to fulfill this type of transaction and others similarly related, commercial transaction management component 72 interacts with banks 74, credit card companies 76 and vendors 78.

Figure 5:
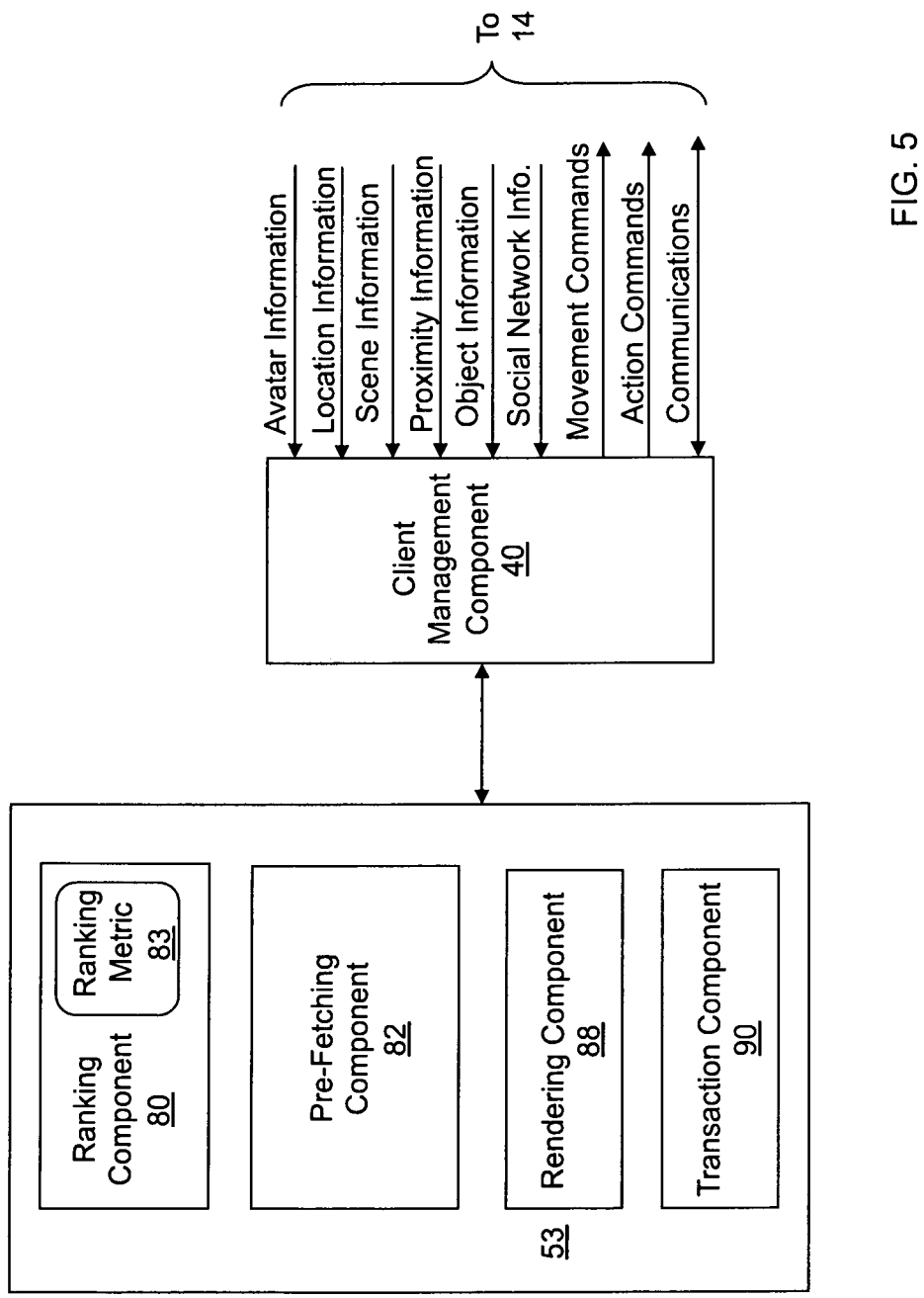
FIG. 5 shows a pre-fetching tool according to one embodiment of this invention that operates in the environment shown in FIG. 1.

Referring now to FIGS. 2 and 5, pre-fetching tool 53 of the present invention will be described in further detail. As mentioned above, pre-fetching tool 53 provides the capability to pre-fetch virtual content in virtual universe 12 based on the social network of avatar 38. As it is possible that the social network of avatar 38 may contain a large number of members, it is generally undesirable to download the virtual content surrounding every member of the social network indiscriminately. Therefore, pre-fetching tool 53 comprises a ranking component 80 configured to rank each of members 39 belonging to the social network of avatar 38 according to predefined ranking criteria. Ranking component 80 analyzes a set of past interactions between avatar 38 and each of members 39 belonging to the social network of avatar 38 to determine a set of members from members 39 that are more likely to have a future interaction, such as a teleport action, with avatar 38. The members who are more likely to have a meaningful future interaction with avatar 38 are given preference over other members.

The ranking of members 39 may be composed of multiple discrete rankings. In one embodiment, the predefined ranking criteria includes at least one of the following: a number of interactions between avatar 38 and each of members 39 belonging to the social network of avatar 38, a type of interaction between avatar 38 and each of members 39 belonging to the social network of avatar 38, or an interaction date of an interaction between avatar 38 and each of members 39 belonging to the social network of avatar 38. However, these examples are only illustrative of some of the criteria that may be used and those skilled in the art will recognize that other criteria may be used.

As mentioned above, the particular type of interaction between avatar 38 and each of members 39 of the social network of avatar 38 can be used to influence the ranking. For example, one member might offer a teleport invitation to their location, wherein avatar 38 would have the option of accepting or rejecting the offer. Another member might share a texture, object, note card, or script with avatar 38, or interact with avatar 38 via messaging (e.g., private chat). In an exemplary embodiment, the member offering the teleport invitation is given the highest priority, as it is more likely that this member will offer a future teleport invitation to avatar 38.

Ranking component 80 also monitors the number of interactions between avatar 38 and each of members 39 belonging to the social network of avatar 38. For example, ranking component 80 may calculate the total number of interactions between avatar 38 and each of members 39, as well as the number of each specific interaction type. Members with a higher number of interactions are generally given a higher ranking, as these members are more likely to have a future interaction with avatar 38.

Furthermore, ranking component 80 is configured to track the date of each interaction between avatar 38 and each of members 39. In one embodiment, precedence is given to more recent interactions. This enables ranking component 80 to weight recent interactions over older interactions. For example, a teleport offer received two weeks ago is more likely to predict a teleport offer within the next week than a teleport offer that was received six months ago. Therefore, the members involved in more recent transactions are given a higher priority.

In one embodiment, the ranking component 80 includes a ranking metric 83 for determining the rank of each of members 39 of the social network of avatar 38. Referring to the ranking metric 83 below, which is described in the context of Tables 1-4, one possible method of implementing the described ranking method is shown. In this example, the interaction date predominately determines the rank of each member.

TABLE 1

| Interaction Date | Current month | Previous month | ... | Eleven months ago | Twelve months ago or more |
|---|---|---|---|---|---|
| Date-Factor | 12 | 11 | ... | 2 | 1 |

As shown in Table 1, terms occurring in the current month are given a factor of 12, while terms occurring twelve months ago or more are given a factor of 1. Further, some interaction types may indicate a higher likelihood of an avatar visiting one of the members within the avatar's social network. As shown in Table 2, these interaction types are given a higher interaction factor. In this example, priority is given to teleport offers.

TABLE 2

| Interaction Type | Interaction Factor |
|---|---|
| Teleport Offer | 3 |
| Messaging | 2 |
| Share texture/object/script | 1 |

Consider Table 3 below, which shows the following interactions between an avatar and various members belonging to the avatar's social network.

TABLE 3

| Member's Name | Interaction/Activity | Interaction Date |
|---|---|---|
| Media Korobase | Messaging | October 2007 |
| Media Korobase | Teleport | October 2007 |
| Goldman | Shared Object | October 2007 |
| Christian | Messaging | September 2007 |
| Timberlake | Teleport | January 2007 |

Using the information depicted in the above three tables, Table 4 is generated that contains the ranking order for the members of the social network listed in Table 3. The calculations assume the calculation month is October, 2007.

TABLE 4

| Rank | Avatar's Name | Ranking order calculation |
|---|---|---|
| 1 | Media Korobase | (2 × 12) + (3 × 12) = 60 |
| 2 | Christian | 2 × 11 = 22 |
| 3 | Goldman | 1 × 12 = 12 |
| 4 | Timberlake | 3 × 3 = 9 |

As shown in Table 4, the first member in the social network (Media Korbase) had two interactions within the current month. Media Korobase first sent a message (interaction-factor=2) during the current month (date-factor=12). This first action increased Media Korobase's ranking by 24 points. Furthermore, Media Korobase offered a teleport invitation (interaction-factor=3) after the messaging conversation (date-factor=12), which added another 36 points to Media Korobase's ranking. Together the total ranking is 60. Therefore, the virtual content surrounding Media Korobase is pre-fetched and delivered to a cache accessible by the avatar to improve the rendering of virtual content in the event of a subsequent teleport offer from Media Korobase. In another embodiment, the virtual content surrounding Christian is also pre-fetched and delivered to the cache, as Christian's ranking of 22 also makes it likely a future teleport action between the avatar and Christian will occur. It can be appreciated that the above described ranking metric 83 is only one suitable ranking method and is not intended to suggest any limitation as to the scope of use or functionality of the approach described herein. For example, the virtual content surrounding any number of members of the social network may be pre-fetched depending upon user preference, cache size constraints, etc.

Referring again to FIG. 5, pre-fetching tool 53 further comprises a pre-fetching component 82 configured to pre-fetch the virtual content within a proximity of each of members 39 belonging to the social network of avatar 38 based on the ranking by ranking component 80. Pre-fetching component 82 downloads and caches the objects, textures and scripts that are most likely to be surrounding avatar 38 in the event that avatar 38 teleports to a region where one of members 39 is located. By assigning a ranking to each member of the social network, the members that are more likely to offer a future interaction, particularly a teleport action, can be determined. The virtual content at the remote location of the higher ranked members can be pre-fetched by pre-fetching component 82 and delivered to cache 45 (as shown in FIG. 3) for future rendering. Pre-fetching component 82 permits the virtual universe to cache objects most likely to be surrounding avatar 38 in the future based on the interactions that have occurred in the past between avatar 38 and each of members 39.

As further shown in FIG. 5, pre-fetching tool 53 comprises a rendering component 88 configured to render the pre-fetched virtual content within a proximity of each of members 39 belonging to the social network of avatar 38. As used herein, rendering is the process of producing the pixels of an image from a higher-level description of its components. Additionally, rendering is the process of generating an image from a model, by means of computer programs. The model is a description of three-dimensional objects in a strictly defined language or data structure. Models contain geometry, viewpoint, texture, lighting, and shading information.

In another embodiment of this invention, pre-fetching tool 53 is used as a service to charge fees for each pre-fetch or download invoked. As shown in FIG. 5, pre-fetching tool 53 comprises a transaction component 90 configured to charge a pre-fetching fee for pre-fetching the virtual content. In this embodiment, the provider of the virtual universe or a third party service provider could offer this pre-fetching as a service by performing the functionalities described herein on a subscription and/or fee basis. In this case, the provider of the virtual universe or the third party service provider can create, deploy, maintain, support, etc., pre-fetching tool 53 that performs the processes described in the invention. In return, the virtual universe or the third party service provider can receive payment from the virtual universe residents via universe economy management component 70 and commercial transaction management component 72.

In still another embodiment, the methodologies disclosed herein can be used within a computer system to provide pre-fetching of the virtual content in the virtual universe. In this case, pre-fetching tool 53 can be provided, and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

Figure 6:
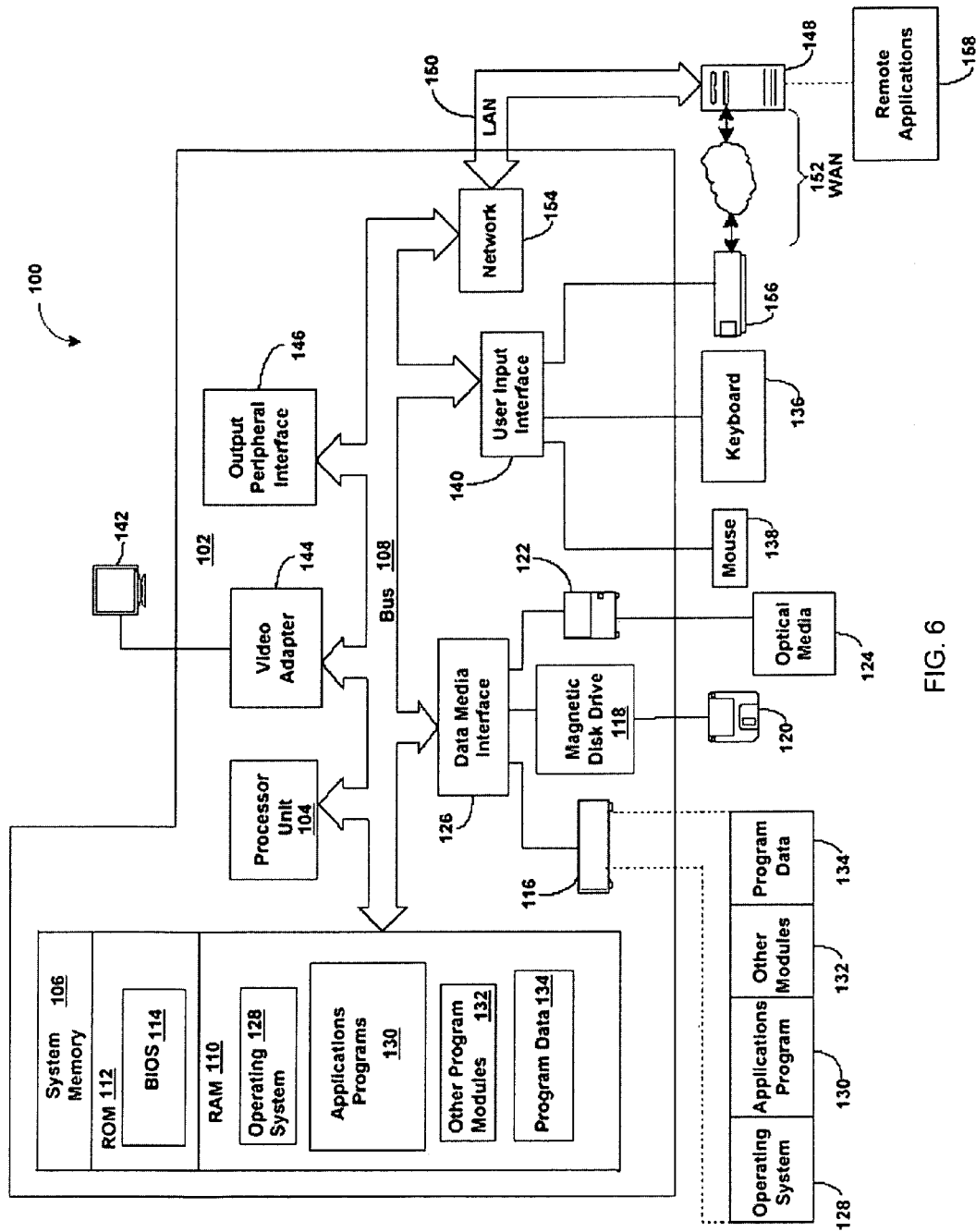
FIG. 6 shows a schematic of an exemplary computing environment in which elements of the networking environment shown in FIG. 1 may operate.

FIG. 6 shows a schematic of an exemplary computing environment in which elements of the networking environment shown in FIG. 1 may operate. The exemplary computing environment 100 is only one example of a suitable computing environment and is not intended to suggest any limitation as to the scope of use or functionality of the approach described herein. Neither should computing environment 100 be interpreted as having any dependency or requirement relating to any one or combination of components illustrated in FIG. 6.

In the computing environment 100 there is a computer 102, which is operational with numerous other general purpose or special purpose computing system environments or configurations. Examples of well known computing systems, environments, and/or configurations that may be suitable for use with exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on that perform particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 6, computer 102 in the computing environment 100 is shown in the form of a general-purpose computing device. The components of computer 102 may include, but are not limited to, one or more processors or processing units 104, a system memory 106, and a bus 108 that couples various system components including system memory 106 to processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 102 typically includes a variety of computer readable media. Such media may be any available media that is accessible by computer 102, and it includes both volatile and non-volatile media, removable and non-removable media.

In FIG. 6, system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 6 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on hard disk 116, magnetic disk 120, optical disk 122, ROM 112, or RAM 110, including, by way of example, and not limitation, an operating system 128, one or more application programs 130, other program modules 132, and program data 134. Each of operating system 128, one or more application programs 130 other program modules 132, and program data 134 or some combination thereof, may include an implementation of the networking environment 10 of FIG. 1 including server array 14, virtual universe client 24 and pre-fetching tool 53. In one embodiment, the one or more application programs 130 include components of pre-fetching tool 53 such as ranking component 80, pre-fetching component 82, rendering component 88, and transaction component 90.

Figure 7:
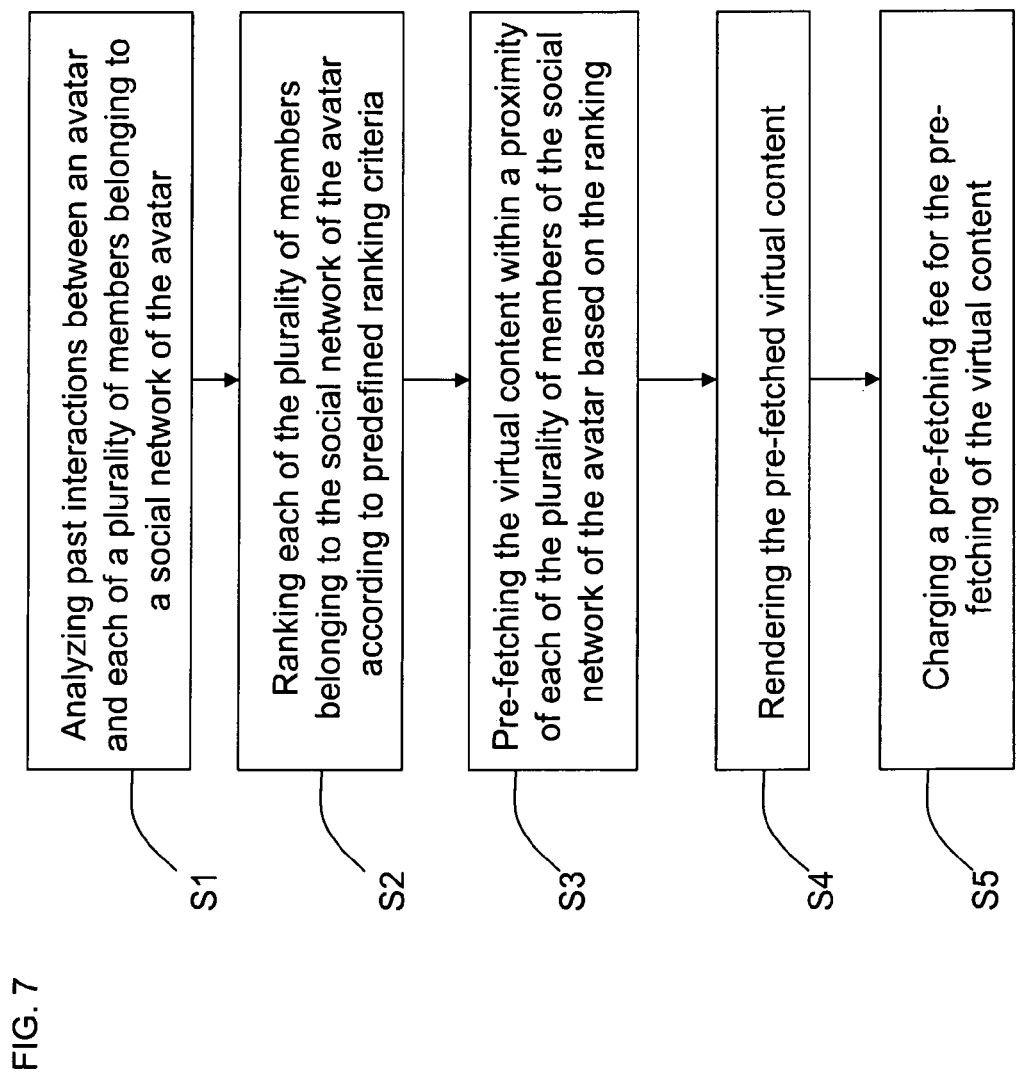
FIG. 7 shows a flow diagram of a method for pre-fetching virtual content in the virtual universe according to one embodiment of the invention.

The one or more program modules 130 carry out the methodologies disclosed herein, as shown in FIG. 7. According to one embodiment, in step S1, past interactions between an avatar and each of a plurality of members belonging to a social network of the avatar are analyzed. In S2, each of the plurality of members belonging to the social network of the avatar are ranked according to predetermined ranking criteria. In S3, the virtual content within a proximity of each of the plurality of members belonging to the social network of the avatar is pre-fetched. In S4, the pre-fetched virtual content is rendered. In S5, a pre-fetching fee for pre-fetching the virtual content is charged.

The flowchart of FIG. 7 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Referring back to FIG. 6, a user may enter commands and information into computer 102 through optional input devices such as a keyboard 136 and a pointing device 138 (e.g., a "mouse"). Other input devices (not shown) may include a microphone, joystick, game pad, satellite dish, serial port, scanner, camera, or the like. These and other input devices are connected to processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 6 are a local area network (LAN) 150 and a general wide area network (WAN) 152. Such networking environments are commonplace in offices, enterprise-wide computer networks, intranets, and the Internet. When used in a LAN networking environment, computer 102 is connected to LAN 150 via network interface or adapter 154. When used in a WAN networking environment, the computer typically includes a modem 156 or other means for establishing communications over WAN 152. The modem, which may be internal or external, may be connected to system bus 108 via user input interface 140 or other appropriate mechanism.

In a networked environment, program modules depicted relative to computer 102, or portions thereof, may be stored in a remote memory storage device. By way of example, and not limitation, FIG. 6 illustrates remote application programs 158 as residing on a memory device of remote computer 148. It will be appreciated that the network connections shown and described are exemplary and other means of establishing a communications link between the computers may be used.

An implementation of computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for pre-fetching virtual content within a virtual universe. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for pre-fetching virtual content in a virtual universe, comprising the computer implemented steps of:
    ranking each of a plurality of members belonging to a social network of an avatar according to predefined ranking criteria to determine a set of members from the plurality of members belonging to the social network of the avatar that are more likely to have a future interaction with the avatar based on a history and mode of past interactions between the avatar and each of the plurality of members belonging to the social network of the avatar, wherein the predefined ranking criteria assigns a higher rank to one or more members from the plurality of members belonging to the social network of the avatar located in a different region of the virtual universe than the avatar and likely to have a future teleportation interaction with the avatar based on a past history of a teleport action with the avatar;
    pre-fetching a virtual content within a proximity of each of the plurality of members belonging to the social network of the avatar, including members located in the different region of the virtual universe than the avatar, based on the ranking; and
    expiring, from a cache, the virtual content within a proximity of each of the plurality of members belonging to the social network of the avatar according to the ranking, wherein the virtual content within a proximity of lower ranking members belonging to the social network of the avatar is expired before the virtual content within a proximity of higher ranking members belonging to the social network of the avatar.

2. The method according to claim 1 further comprising rendering the virtual content within a proximity of each of the plurality of members belonging to the social network of the avatar.

3. The method according to claim 1, the predefined ranking criteria including at least one of the following: a number of interactions between the avatar and each of the plurality of members belonging to the social network of the avatar, a type of interaction between the avatar and each of the plurality of members belonging to the social network of the avatar, or an interaction date of an interaction between the avatar and each of the plurality of members belonging to the social network of the avatar.

4. The method according to claim 1 further comprising the computer implemented step of charging a pre-fetching fee for pre-fetching the virtual content within a proximity of each of the plurality of members belonging to the social network of the avatar.

5. A computer system for pre-fetching virtual content in a virtual universe, comprising:
    at least one processing unit;
    memory operably associated with the at least one processing unit; and
    a pre-fetching tool storable in memory and executable by the at least one processing unit, the pre-fetching tool comprising:
        a ranking component configured to rank each of a plurality of members belonging to a social network of an avatar according to predefined ranking criteria to determine a set of members from the plurality of members belonging to the social network of the avatar that are more likely to have a future interaction with the avatar based on a history and mode of past interactions between the avatar and each of the plurality of members belonging to the social network of the avatar, wherein the predefined ranking criteria assigns a higher rank to one or more members from the plurality of members belonging to the social network of the avatar located in a different region of the virtual universe than the avatar and likely to have a future teleportation interaction with the avatar based on a past history of a teleport action with the avatar;
        a pre-fetching component configured to pre-fetch a virtual content within a proximity of each of the plurality of members belonging to the social network of the avatar, including members located in the different region of the virtual universe than the avatar, based on the ranking; and
        a cache expiration component configured to expire, from a cache, the virtual content within a proximity of each of the plurality of members belonging to the social network of the avatar according to the ranking, wherein the virtual content within a proximity of lower ranking members belonging to the social network of the avatar is expired before the virtual content within a proximity of higher ranking members belonging to the social network of the avatar.

6. The pre-fetching tool according to claim 5 further comprising a rendering component configured to render the virtual content within a proximity of each of the plurality of members belonging to the social network of the avatar.

7. The pre-fetching tool according to claim 5, the predefined ranking criteria including at least one of the following: a number of interactions between the avatar and each of the plurality of members of the social network of the avatar, a type of interaction between the avatar and each of the plurality of members of the social network of the avatar, or an interaction date of an interaction between the avatar and each of the plurality of members belonging to the social network of the avatar.

8. The pre-fetching tool according to claim 5 further comprising a transaction component for charging a pre-fetching fee for pre-fetching the virtual content within a proximity of each of the plurality of members belonging to the social network of the avatar.

9. A computer-readable storage device storing computer instructions, which when executed, enables a computer system to provide pre-fetching of virtual content in a virtual universe, the computer instructions comprising:
    ranking each of a plurality of members belonging to a social network of an avatar according to predefined ranking criteria to determine a set of members from the plurality of members belonging to the social network of the avatar that are more likely to have a future interaction with the avatar based on a history and mode of past interactions between the avatar and each of the plurality of members belonging to the social network of the avatar, wherein the predefined ranking criteria assigns a higher rank to one or more members from the plurality of members belonging to the social network of the avatar located in a different region of the virtual universe than the avatar and likely to have a future teleportation interaction with the avatar based on a past history of a teleport action with the avatar;
    pre-fetching a virtual content within a proximity of each of the plurality of members belonging to the social network of the avatar, including members located in the different region of the virtual universe than the avatar, based on the ranking; and expiring, from a cache, the virtual content within a proximity of each of the plurality of members belonging to the social network of the avatar according to the ranking, wherein the virtual content within a proximity of lower ranking members belonging to the social network of the avatar is expired before the virtual content within a proximity of higher ranking members belonging to the social network of the avatar.

10. The computer-readable storage device according to claim 9 further comprising instructions for rendering the virtual content within a proximity of each of the plurality of members belonging to the social network of the avatar.

11. The computer-readable storage device according to claim 9, the predefined ranking criteria including at least one of the following: a number of interactions between the avatar and each of the plurality of members of the social network of the avatar, a type of interaction between the avatar and each of the plurality of members of the social network of the avatar, or an interaction date of an interaction between the avatar and each of the plurality of members belonging to the social network of the avatar.

12. The computer-readable storage device according to claim 9 further comprising instructions for charging a pre-fetching fee for pre-fetching the virtual content within a proximity of each of the plurality of members belonging to the social network of the avatar.

13. A method for deploying a pre-fetching tool for use in a computer system that provides pre-fetching of virtual content in a virtual universe, the method comprising the computer implemented steps to:

rank each of a plurality of members belonging to a social network of an avatar according to predefined ranking criteria to determine a set of members from the plurality of members belonging to the social network of the avatar that are more likely to have a future interaction with the avatar based on a history and mode of past interactions between the avatar and each of the plurality of members belonging to the social network of the avatar, wherein the predefined ranking criteria assigns a higher rank to one or more members from the plurality of members belonging to the social network of the avatar located in a different region of the virtual universe than the avatar and likely to have a future teleportation interaction with the avatar based on a past history of a teleport action with the avatar;

pre-fetch a virtual content within a proximity of each of the plurality of members of the social network of the avatar, including members located in the different region of the virtual universe than the avatar, based on the ranking; and expire, from a cache, the virtual content within a proximity of each of the plurality of members belonging to the social network of the avatar according to the ranking, wherein the virtual content within a proximity of lower ranking members belonging to the social network of the avatar is expired before the virtual content within a proximity of higher ranking members belonging to the social network of the avatar.

14. The method according to claim 13 further comprising the computer implemented step to render the virtual content within a proximity of each of the plurality of members belonging to the social network of the avatar.

15. The method according to claim 13, the predefined ranking criteria including at least one of the following: a number of interactions between the avatar and each of the plurality of members of the social network of the avatar, a type of interaction between the avatar and each of the plurality of members of the social network of the avatar, or an interaction date of an interaction between the avatar and each of the plurality of members belonging to the social network of the avatar.

16. The method according to claim 13 further comprising the computer implemented step to charge a pre-fetching fee for pre-fetching the virtual content within a proximity of each of the plurality of members belonging to the social network of the avatar.

* * * * *